(12) United States Patent
Kuriki

(10) Patent No.: US 9,065,947 B2
(45) Date of Patent: Jun. 23, 2015

(54) IMAGE READING APPARATUS

(71) Applicant: BROTHER KOGYO KABUSHIKI KAISHA, Nagoya-shi, Aichi-ken (JP)

(72) Inventor: Yuichiro Kuriki, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/471,637

(22) Filed: Aug. 28, 2014

(65) Prior Publication Data

US 2015/0062667 A1    Mar. 5, 2015

(30) Foreign Application Priority Data

Aug. 30, 2013    (JP) .................. 2013-178875

(51) Int. Cl.
  *B65H 1/06*    (2006.01)
  *B65H 5/26*    (2006.01)
  *H04N 1/00*    (2006.01)

(52) U.S. Cl.
  CPC ......... *H04N 1/0057* (2013.01); *H04N 1/00795* (2013.01)

(58) Field of Classification Search
  CPC ........................................................ B65H 1/06
  See application file for complete search history.

(56) References Cited

U.S. PATENT DOCUMENTS

| | | | |
|---|---|---|---|
| 5,547,179 A | 8/1996 | Wilcox et al. | |
| 6,135,441 A * | 10/2000 | Belec et al. | 271/35 |
| 2001/0020765 A1 * | 9/2001 | Araki et al. | 271/125 |
| 2003/0142191 A1 | 7/2003 | Rasmussen et al. | |
| 2005/0057785 A1 | 3/2005 | Endo | |
| 2008/0259414 A1 | 10/2008 | Kitagawa et al. | |
| 2008/0285097 A1 | 11/2008 | Kitagawa et al. | |
| 2012/0105925 A1 | 5/2012 | Shirai et al. | |
| 2014/0092456 A1 | 4/2014 | Ukai | |

FOREIGN PATENT DOCUMENTS

| | | |
|---|---|---|
| JP | 9-284478 A | 10/1997 |
| JP | 2005-051313 A | 2/2005 |
| JP | 2008-270954 A | 11/2008 |

(Continued)

OTHER PUBLICATIONS

Notice of Allowance dated Aug. 15, 2014 issued in related U.S. Appl. No. 14/039,944.

*Primary Examiner* — King Poon
*Assistant Examiner* — Ibrahim Siddo
(74) *Attorney, Agent, or Firm* — Scully, Scott, Murphy & Presser, P.C.

(57) ABSTRACT

An image reading apparatus includes a housing, a first guide, a second guide, a first conveyor, and a reader. The first guide provides a first path between a first opening and a second opening. The second guide provides a second path between a third opening and a junction where the first path intersects the second path. The first conveyor includes first and second drive rollers, first and second driven rollers, first and second springs. The first drive roller is disposed inside a path, which includes at least the second path, between the third opening and the second opening, while the second drive roller is disposed outside the path. The first spring biases the first driven roller toward the first drive roller with a first biasing force ($F_1$). The second spring biases the second driven roller toward the second drive roller with a second biasing force ($F_2$), where $F_2 > F_1$.

21 Claims, 9 Drawing Sheets

(56) References Cited

FOREIGN PATENT DOCUMENTS

| | | |
|---|---|---|
| JP | 2008-285259 A | 11/2008 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |

* cited by examiner

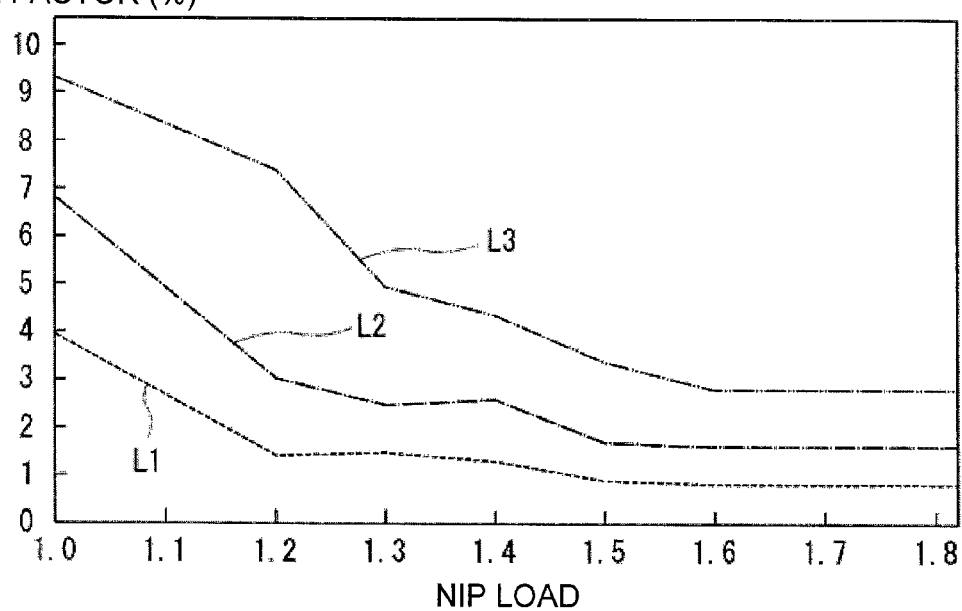

IMAGE READING APPARATUS

CROSS-REFERENCE TO RELATED APPLICATION

This application claims priority from Japanese Patent Application No. 2013-178875 filed on Aug. 30, 2013, the content of which is incorporated herein by reference in its entirety.

FIELD

Aspects described herein relate to an image reading apparatus.

BACKGROUND

A known image reading apparatus includes a housing, a first guide portion, a second guide portion, a reader and a conveyer. The housing includes a first introduction opening, a second introduction opening, and a discharge opening. The second introduction opening is disposed in one end side of the first introduction opening in a width direction. A width of the second introduction opening is less than that of the first introduction opening in the width direction. The discharge opening communicates with the first introduction opening and the second introduction opening. The first guide portion connects the first introduction opening and the discharge opening. The first guide portion includes a bent portion therein. The second guide portion is disposed in the housing. The second guide portion connects straightway the second introduction opening and a junction between the first guide portion and the second guide portion. The junction is disposed close to the bent portion of the first guide portion. The reader is disposed in the housing. The conveyer is disposed in the housing.

The conveyer includes a first conveyor portion. The first conveyor portion is disposed between the junction and the discharge opening. The first conveyor portion includes a first drive roller, a second drive roller, a first driven roller, and a second driven roller. The first drive roller is disposed inside a path between the second introduction opening and the discharge opening and one end side in the width direction. The second drive roller is disposed in center side with respect to the first drive roller and outside the path in the width direction. The first drive roller and the second drive roller are rotated by a drive force from a drive source. The first driven roller is opposed to the first drive roller to pinch a medium guided by the first guide portion. The second driven roller is opposed to the second drive roller to pinch a medium guided by the second guide portion.

BRIEF SUMMARY

According to an aspect of the disclosure, an apparatus comprising a housing, a first guide, a second guide, a first conveyor, and a reader. The first guide is disposed in the housing and is configured to provide a first path between a first opening and a second opening. The first guide comprises an first portion and a second portion. The first opening extends in a first direction. The second opening extends in the first direction. The second opening is in communication with the first opening. The first portion is inclined and where the first portion of the first guide extends from the first opening to a first position and the second portion of the first guide extends from the first position to the second opening. The second guide is disposed in the housing and is configured to provide a second path between a third opening and a junction. The junction is located where the first path intersects the second path. The third opening is in communication with the second opening and is offset from the first opening in a second direction. The third opening is formed in a position located at one side of the first opening in the first direction. The first conveyor comprises a first drive roller, a second drive, a first driven roller, a second driven roller, a first spring, and a second spring. The first conveyor is in the second portion of the first guide. The first drive roller is disposed inside a path between the third opening and the second opening. The path comprises at least the second path. The first drive roller is offset of a center of the first guide in the first direction. The second drive roller is disposed outside the path between the third opening and the second opening. A distance between the center of the first guide and the second drive roller is less than a distance between the center of the first guide and the first drive roller in first direction. The first driven roller opposes the first drive roller. The second driven roller opposes the second drive roller. The first spring biases the first driven roller toward the first drive roller with a first biasing force ($F_1$). The second spring biases the second driven roller toward the second drive roller with a second biasing force ($F_2$), where $F_2 > F_1$. The reader is configured to read an image of a medium passing through the junction.

According to another aspect of the disclosure, an image reading apparatus comprises a housing, a separation roller, a set of slidable protrusions, a reader, a first drive roller, a second drive roller, a first driven roller, a second driven roller, a first spring, and a second spring. The housing having a first opening, a second opening, and a third opening. The first opening extends in a first direction. The second opening have a length shorter than a length of the first opening in the first direction. The second opening is formed in a position located at one side of the first opening in the first direction and is offset from the first opening in a second direction, the second direction being perpendicular to the first direction. The housing defines a first conveyance path communicating the first opening and the third opening. The housing further defines a second conveyance path communicating the second opening and the third opening, at least a portion of the second conveyance path being offset from at least a portion of the first conveyance path in the second direction. The separation roller is rotatably supported in the housing. The separation roller is disposed inside the first conveyance path and outside the second conveyance path in the first direction. The set of slidable protrusions is configured to be slidable in the first direction with respect to a center of the separation roller in the first direction. The reader is disposed in the housing and disposed between the separation roller and the third opening in a third direction. The reader is configured to read an image of a medium introduced in at least one of the first opening and the second opening. The third direction is perpendicular to the first direction and the second direction. The first drive roller is disposed between the separation roller and the third opening in the third direction and inside the second conveyance path in the first direction. The second drive roller is disposed between the separation roller and the third opening in the third direction and outside the second conveyance path in the first direction. A distance between a center of the separation roller and the second drive roller is less than a distance between the center of the separation and the first drive roller in the first direction. The first driven roller opposes the first drive roller. The second driven roller opposes the second drive roller. The first spring biases the first driven roller toward the first drive roller with a first biasing force ($F_1$). The second spring biases the second driven roller toward the second drive roller with a second biasing force ($F_2$), where $F_2 > F_1$.

According to yet another aspect of the disclosure, an image reading apparatus comprises a first housing, a second housing, a separation roller, a set of slidable protrusions, a reader, a first drive roller, a second drive roller, a first driven roller, a second driven roller, a first spring, and a second spring. The first housing comprises a first surface and is configured to be movable between a close position and an open position. The first surface comprises a first portion and a second portion, the first portion is inclined and where the first portion extends from one end of the first surface to a first position and the second portion extends from the first position to other end of the first surface in a first direction. The second housing opposes the first housing when the first housing is in the close position. The second housing comprises a second surface facing and spaced apart from the first surface in a second direction perpendicular to the first direction when the first housing is in the close position. The second housing comprises a third surface and a fourth surface facing and spaced apart from the third surface in the second direction. The third surface and the fourth surface extend in a third direction perpendicular to the first and second directions and have a width (W). The second housing is configured to support the first housing movably. The second surface comprises an third portion and a fourth portion, the third portion is inclined and where the third portion extends from one end of the second surface to a second position and the fourth portion extends from the second position to other end of the second surface in the first direction. The separation roller is rotatably supported in the second housing and is exposed from the third portion of the second surface of the second housing. Each of the set of slidable protrusions is configured to be slidable relative to in conjunction with each other in the third direction with respect to the separation roller. The reader is disposed between the separation roller and the other end of the second surface of the second housing in the first direction. The reader is configured to read an image of a medium when a medium is conveyed between the first surface of the first housing and the second surface of the second housing. The first drive roller is disposed between the separation roller and the other end of the second surface of the second housing in the first direction. The first drive roller is exposed from one of the second portion of the first surface of the first housing and the fourth portion of the second surface of the second housing. The first drive roller is disposed within the width (W) of the third surface and the fourth surface of the second housing. The second drive roller is disposed between the separation roller and the other end of the second surface of the second housing in the first direction. The second drive roller is exposed from the one of the second portion of the first surface of the first housing and the fourth portion of the second surface of the second housing. A distance between a center of the separation roller and the second drive roller is less than a distance between the center of the separation and the first drive roller in the first direction. The second drive roller is disposed outside the width (W) of the third surface and the fourth surface of the second housing. The first driven roller is exposed from the other of the second portion of the first surface of the first housing and the fourth portion of the second surface of the second housing. The first driven roller opposes the first drive roller. The second driven roller is exposed from the other of the second portion of the first surface of the first housing and the fourth portion of the second surface of the second housing. The second driven roller opposes the second drive roller. The first spring biases the first driven roller toward the first drive roller with a first biasing force ($F_1$). The second spring biases the second driven roller toward the second drive roller with a second biasing force ($F_2$), where $F_2 > F_1$.

According to yet another aspect of the disclosure, an apparatus comprising a housing, a first guide, a second guide, and a first conveyor. The first guide is disposed in the housing and is configured to provide a first path between a first opening and a second opening. The first guide comprises an first portion and a second portion. The first opening extends in a first direction. The second opening extends in the first direction. The second opening is in communication with the first opening. The first portion is inclined and where the first portion of the first guide extends from the first opening to a first position and the second portion of the first guide extends from the first position to the second opening. The second guide is disposed in the housing and is configured to provide a second path between a third opening and a junction. The junction is located where the first path intersects the second path. The third opening is in communication with the second opening and is offset from the first opening in a second direction. The third opening is formed in a position located at one side of the first opening in the first direction. The first conveyor comprises a first drive roller, a second drive, a first driven roller, a second driven roller, a first spring, and a second spring. The first conveyor is in the second portion of the first guide. The first drive roller is disposed inside a path between the third opening and the second opening. The path comprises at least the second path. The first drive roller is offset of a center of the first guide in the first direction. The second drive roller is disposed outside the path between the third opening and the second opening. A distance between the center of the first guide and the second drive roller is less than a distance between the center of the first guide and the first drive roller in first direction. The first driven roller opposes the first drive roller. The second driven roller opposes the second drive roller. The first spring biases the first driven roller toward the first drive roller with a first biasing force ($F_1$). The second spring biases the second driven roller toward the second drive roller with a second biasing force ($F_2$), where $F_2 > F_1$.

BRIEF DESCRIPTION OF THE DRAWINGS

For a more complete understanding of the disclosure, and the objects, features, and advantages thereof, reference now is made to the following descriptions taken in connection with the accompanying drawing.

FIG. 10 is a graph indicating a relationship between a nip load and a sub scanning scale factor.

DETAILED DESCRIPTION

Figure 1:
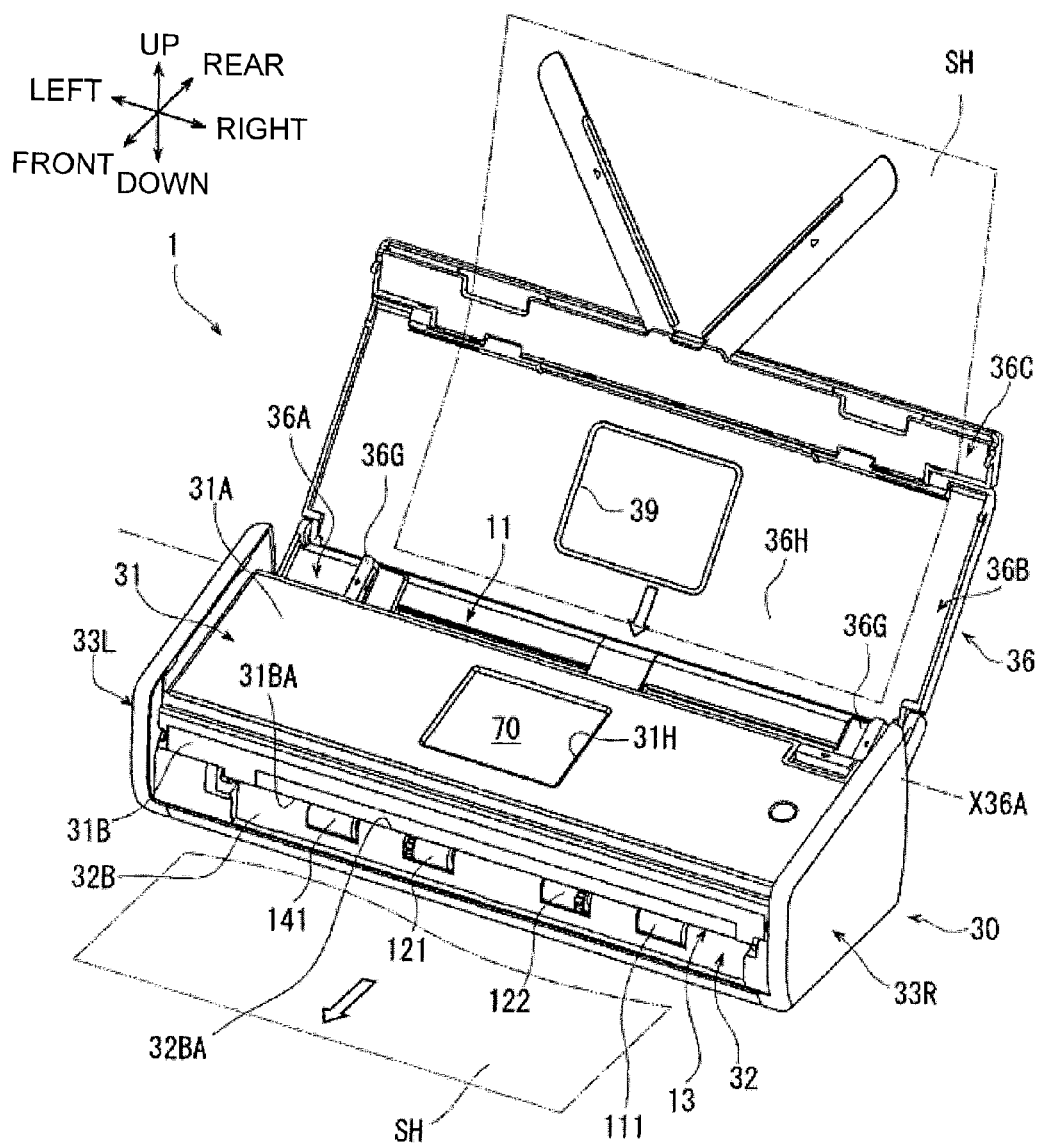
FIG. 1 is a front perspective view of an image reading apparatus, in an example embodiment according to one or more aspects of the disclosure, in which a sheet tray is open.

In a known image reading apparatus, the first driven roller and the second driven roller are generally biased to the first drive roller and the second drive roller, respectively. Further a known image reading apparatus generally includes a regulation member. When plural media with different widths are introduced in the first introduction opening, the regulation member regulates the media with respect to the center of the first introduction opening in the width direction.

The first drive roller and the first driven roller does not pinch a narrow medium, such as a postcard and a business card, since the first drive roller and the first driven roller are disposed inside the path between the second introduction opening and the discharge opening and the one end side in the width direction. The narrow medium is generally thicker than a wide medium, such as a paper, in a thick direction. Thus, when a conveyance direction of a media, introduced in the first introduction opening, is bended by the bent portion, the narrow width media tends to receive stronger conveying friction than the wide medium. As a result, when plural media with different widths are introduced in the first introduction opening, a convening speed difference may arise between the wide media and the narrow media. The conveying speed difference is a difference of a conveying speed of the wide media from the first introduction opening to the discharge opening through the junction and a conveying speed of the narrow media from the first introduction opening to the discharge opening through the junction.

In order to suppress the conveying speed difference, it may be effective to increase both a bias force to bias the first driven roller to the first drive roller and a bias force to bias the second driven roller to the second drive roller. However, increasing the bias forces may deform the housing because the reaction force of the bias forces affects the housing. Then, it is required to increase stiffness of the housing to prevent deformation. Since reinforcing the housing and/or adopting more rigid materials to increase stiffness of the housing, it may cause growing in size and rising in production cost.

An aspect of the disclosure relates to an image reading apparatus configured to suppress the conveying speed difference between the wide media and the narrow media, when plural media with different width are introduced in the first introduction opening, while suppressing the lack of stiffness of the housing.

An example embodiment is described in detail herein with reference to the accompanying drawings, like reference numerals being used for like corresponding parts in the various drawings.

In FIG. 1, a side of an image reading apparatus 1 on which a discharge opening 13 is disposed may be defined as the front side of the image reading apparatus 1. For purposes of the description herein, a side of the image reading apparatus 1 that is placed on the left when viewed from the side facing the discharge opening 13 is defined as the left side of the image reading apparatus 1. To facilitate understanding of the orientation and relationship of the various elements disclosed herein, the front, rear, left, right, up, and down of the image reading apparatus 1 may be determined with reference to axes of the three-dimensional Cartesian coordinate system included in each of the relevant drawings.

As depicted in FIGS. 1-6, the image reading apparatus 1 may comprise a housing 30 and a sheet tray 36. The housing 30 may comprise a first housing 31, a second housing 32. The first housing 31 disposed on the upper side of the image reading apparatus 1 and the second housing 32 disposed on the lower side of the image reading apparatus 1 may oppose one another in a vertical direction, e.g., an up-down direction, with a distance therebetween. The second housing 32 may comprise a first and second side walls 33R and 33L. The first and second side walls 33R and 33L may be spaced apart in the left and right direction. The first side wall 33R defines a right side surface of the second housing 32. The second side wall 33L defines a left side surface of the second housing 32. The upper end of each of the first and second side walls 33R and 33L may be disposed to each of the left and right ends of the first housing 31, respectively. The lower end of each of the first and second side walls 33R and 33L may be connected to each of the left and right ends of the second housing 32, respectively.

The first housing 31 and the second housing 32 may be interposed between the first and second side walls 33R and 33L.

Figure 5:
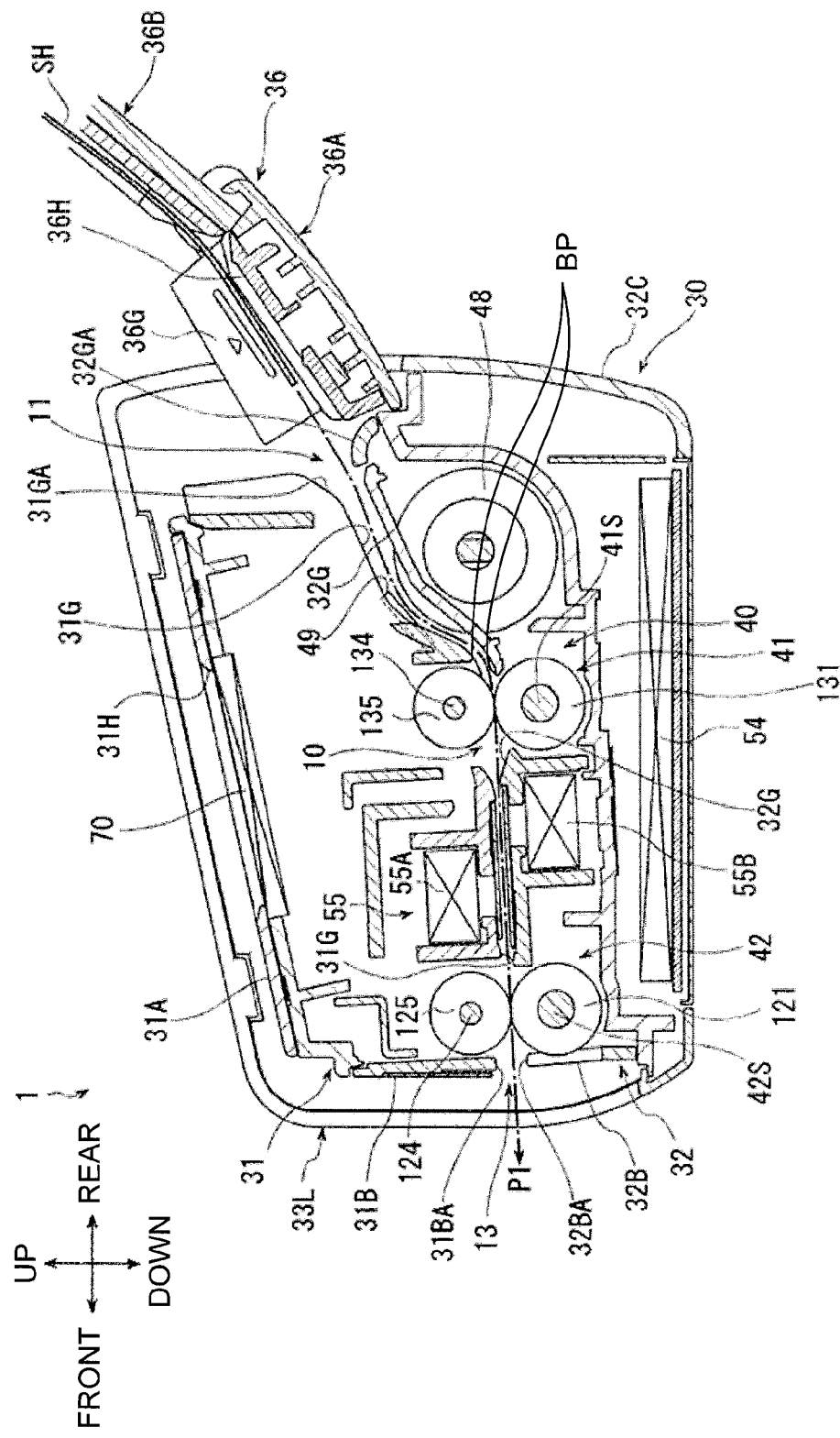
FIG. 5 is a sectional view of the image reading apparatus, taken along the line A-A in FIG. 4.
Figure 6:
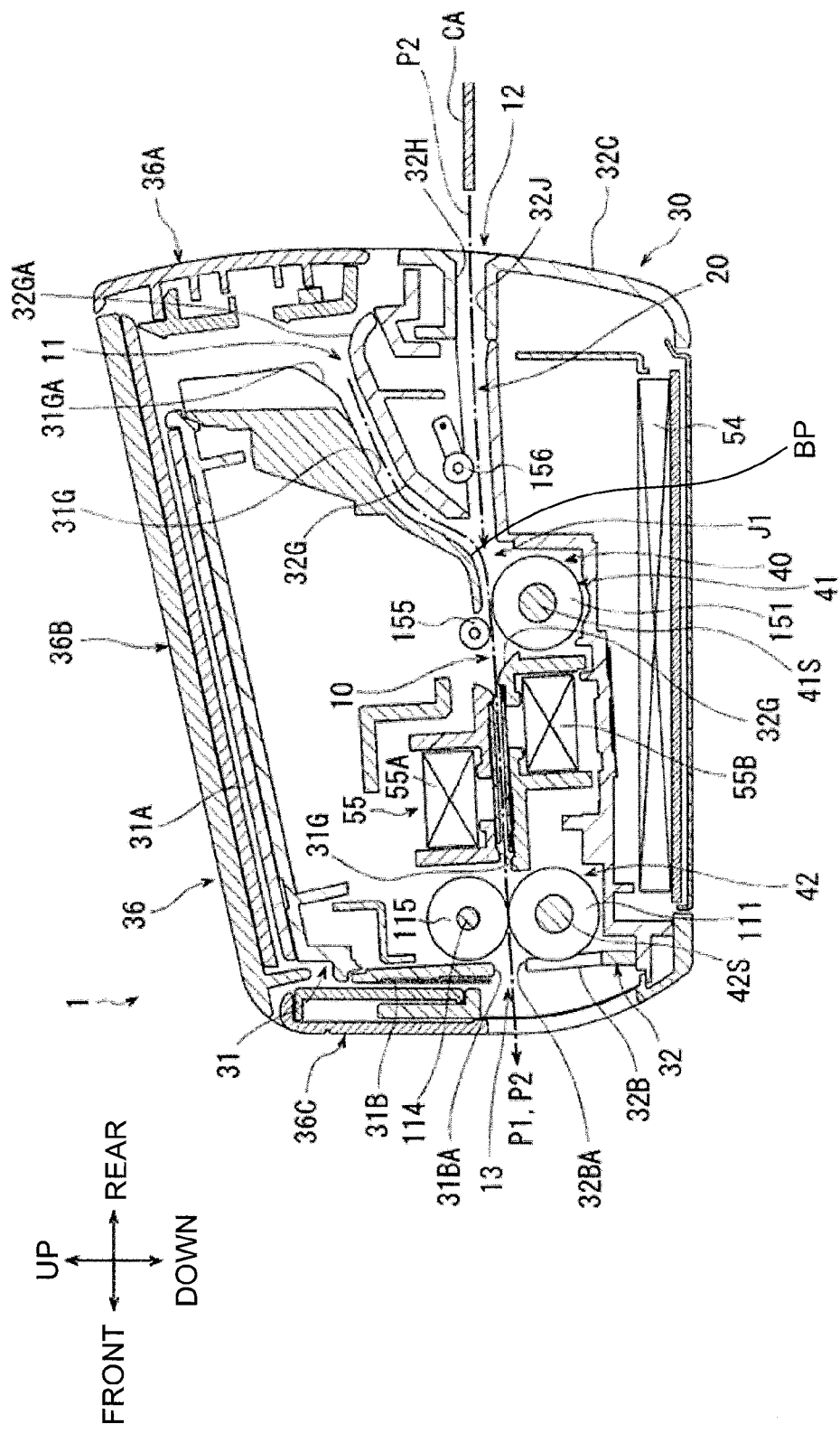
FIG. 6 is a sectional view of the image reading apparatus, taken along the line B-B in FIG. 4.
Figure 7:
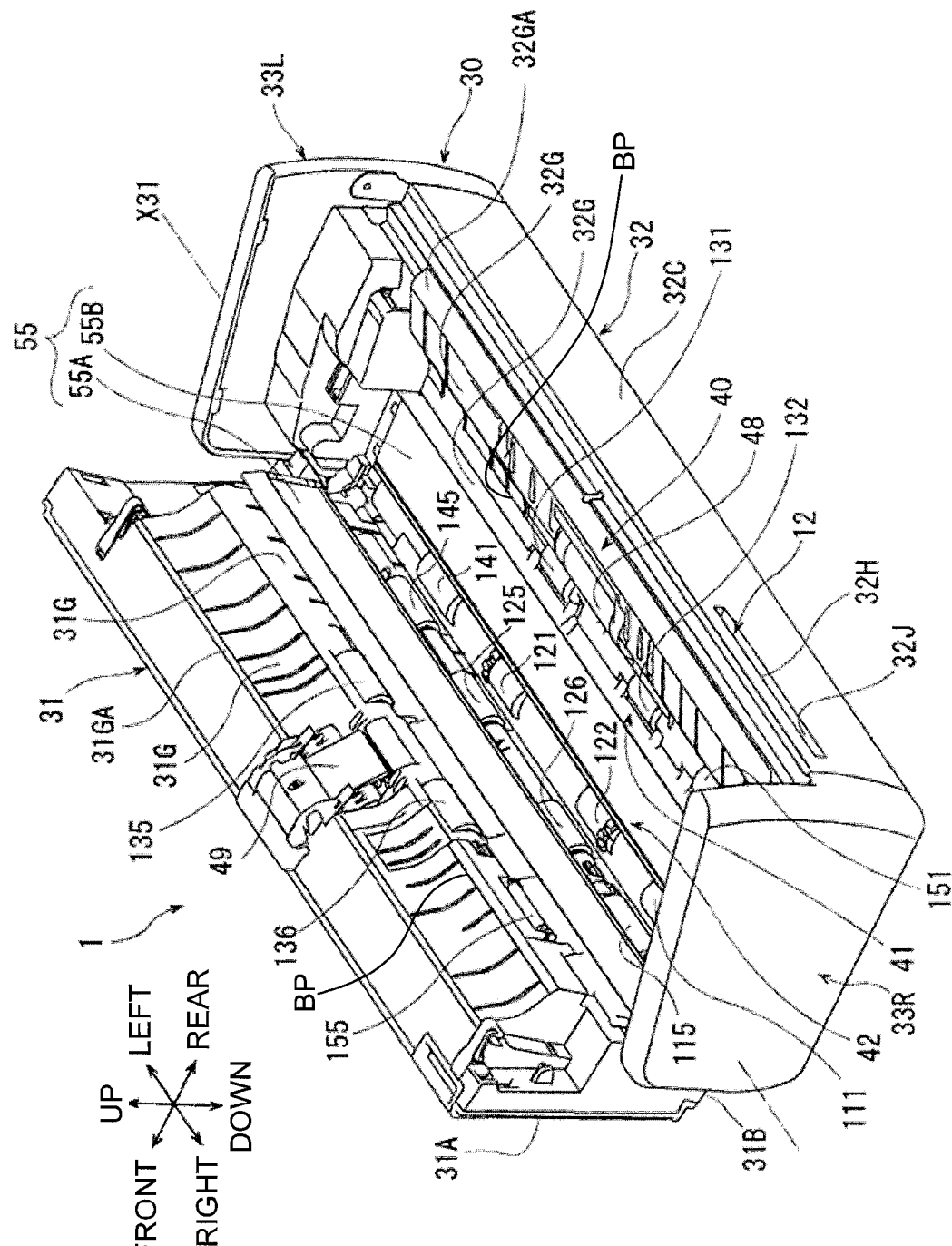
FIG. 7 is a perspective view of the image reading apparatus in which a first housing is pivotally moved.

As depicted in FIGS. 1, 5 and 7, the first housing 31 may comprise an upper surface 31A, a front surface 31B, and an upper guide surface 31G. The upper surface 31A may comprise a flat surface facing upward. The upper surface 31A may slantingly extend forwardly and downwardly from its rear side in a slanted manner. A touch panel 70 may be disposed at a central portion of the upper surface 31A. The front surface 31B may comprise a flat surface facing forward. The front surface 31B may extend vertically downward from the front end of the upper surface 31A to a lower end 31BA. As depicted in FIGS. 5-7, the upper guide surface 31G may comprise a curved surface disposed on a rear portion thereof and a HORIZONTAL surface disposed on a front portion thereof. The curved surface, e.g., an inclined portion, of the upper guide surface 31G may extend forwardly and downwardly from a rear end 31GA thereof, e.g., the rear end of the lower side of the upper surface 31A, in a slanted manner. The flat surface, e.g., a horizontal portion, of the upper guide surface 31G may extend forwardly from a central portion of the first housing 31 in the front-rear direction to the lower end 31BA of the front surface 31B.

As depicted in FIGS. 1, 2 and 5-8, the second housing 32 may comprise a front surface 32B, a lower guide surface 32G and a rear surface 32C. The front surface 32B may comprise a flat surface facing forward. The front surface 32B may comprise an upper end 32BA. The upper end 32BA may be positioned below the lower end 31BA of the front surface 31B with a distance therebetween. The front surface 32B may extend vertically downward from the upper end 32BA. As depicted in FIGS. 5-7, the lower guide surface 32G may comprise a curved surface disposed on a rear portion thereof and a HORIZONTAL surface disposed on a front portion thereof. The curved surface, e.g., an inclined portion, of the lower guide surface 32G may extend forward and downward, in a slanted manner along the inclined portion of the upper guide surface 31G. The flat surface, e.g., a horizontal portion, of the lower guide surface 32G may extend forward from a central portion of the second housing 32 in the front-rear direction to the upper end 32BA of the front surface 32B. The rear surface 32C may comprise a flat surface facing rearward. The rear surface 32C may extend downward from its upper end in a generally vertical direction.

Figure 2:
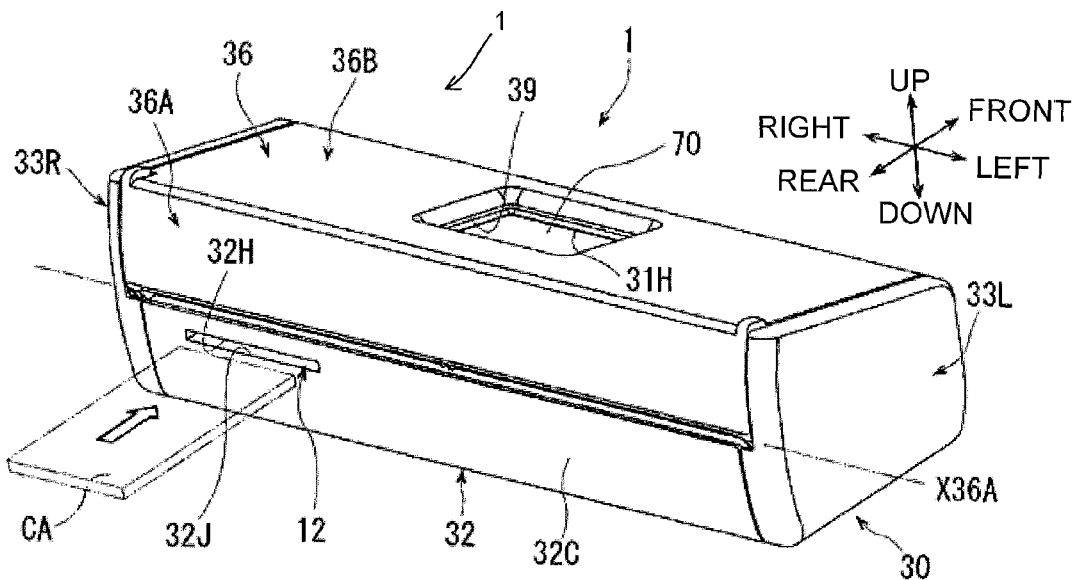
FIG. 2 is a rear perspective view of the image reading apparatus in which the sheet tray is closed.
Figure 8:
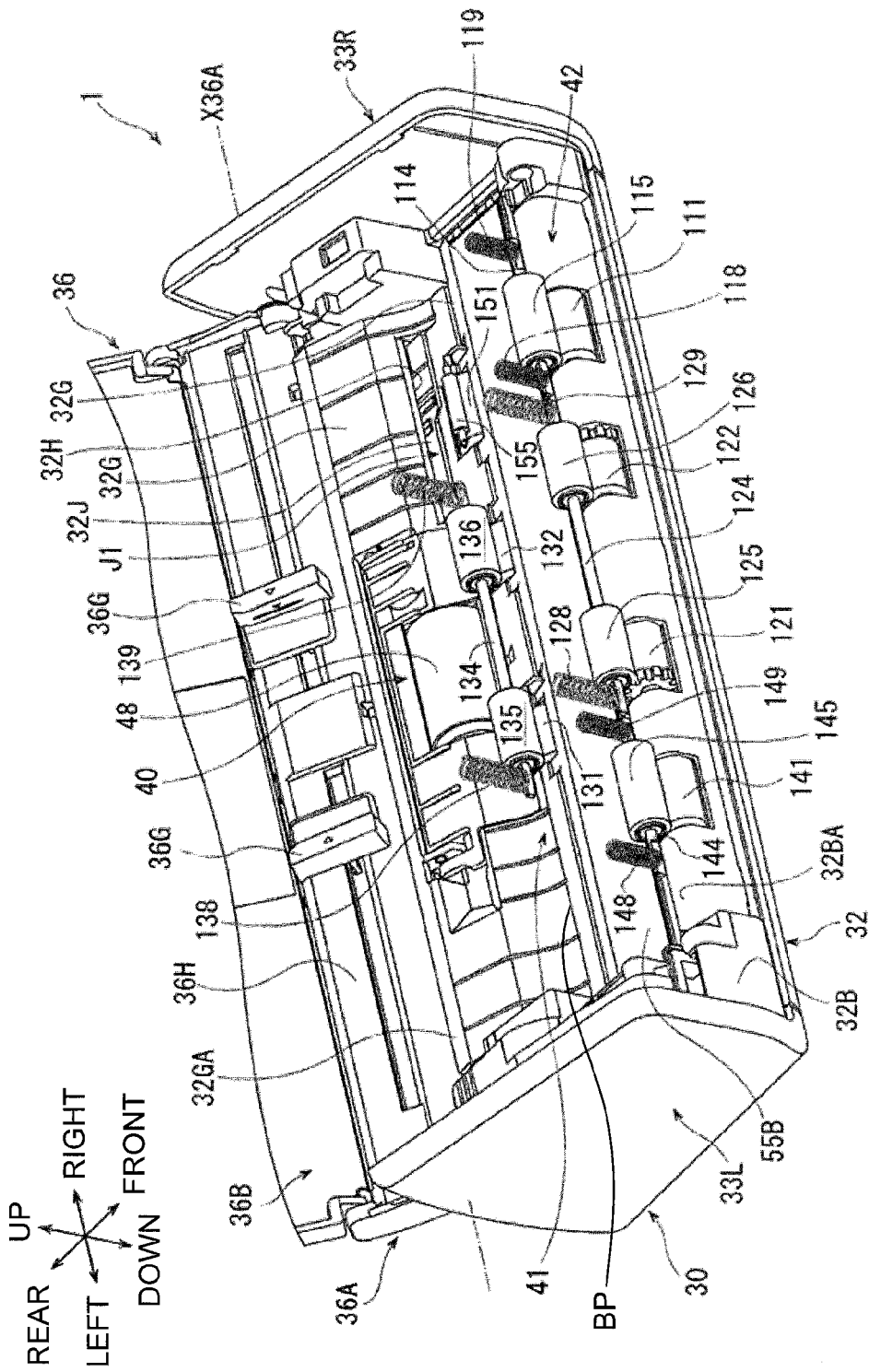
FIG. 8 is a perspective view of the image reading apparatus without the first housing but a first driven roller, a second driven roller, a third driven roller, a fourth driven roller, a first biasing member, a second biasing member, a third biasing member, and a fourth biasing member are remained.

As depicted in FIGS. 2, 6 and 8, the second housing 32 may comprise a lower card guide surface 32J and an upper card guide surface 32H. The lower card guide surface 32J may extend horizontally rearward to the rear surface 32C from a junction J1 (which is described later) of the horizontal portion of the lower guide surface 32G. The upper card guide surface 32H may be positioned above the lower card guide surface 32J with a distance therebetween. The upper card guide surface 32H may extend horizontally rearward to the rear surface 32C in parallel with the lower card guide surface 32J. As depicted in FIG. 6, the height or level of the upper card guide surface 32H in the vertical direction may be substantially the same as the height or level of the horizontal portion of the upper guide surface 31G in the vertical direction.

The upper guide surface 31G, the lower guide surface 32G, the upper card guide surface 32H, and the lower card guide surface 32J might not be limited to a smooth continuous surface, but may be constituted by, for example, tips of ribs or protrusions.

Figure 4:
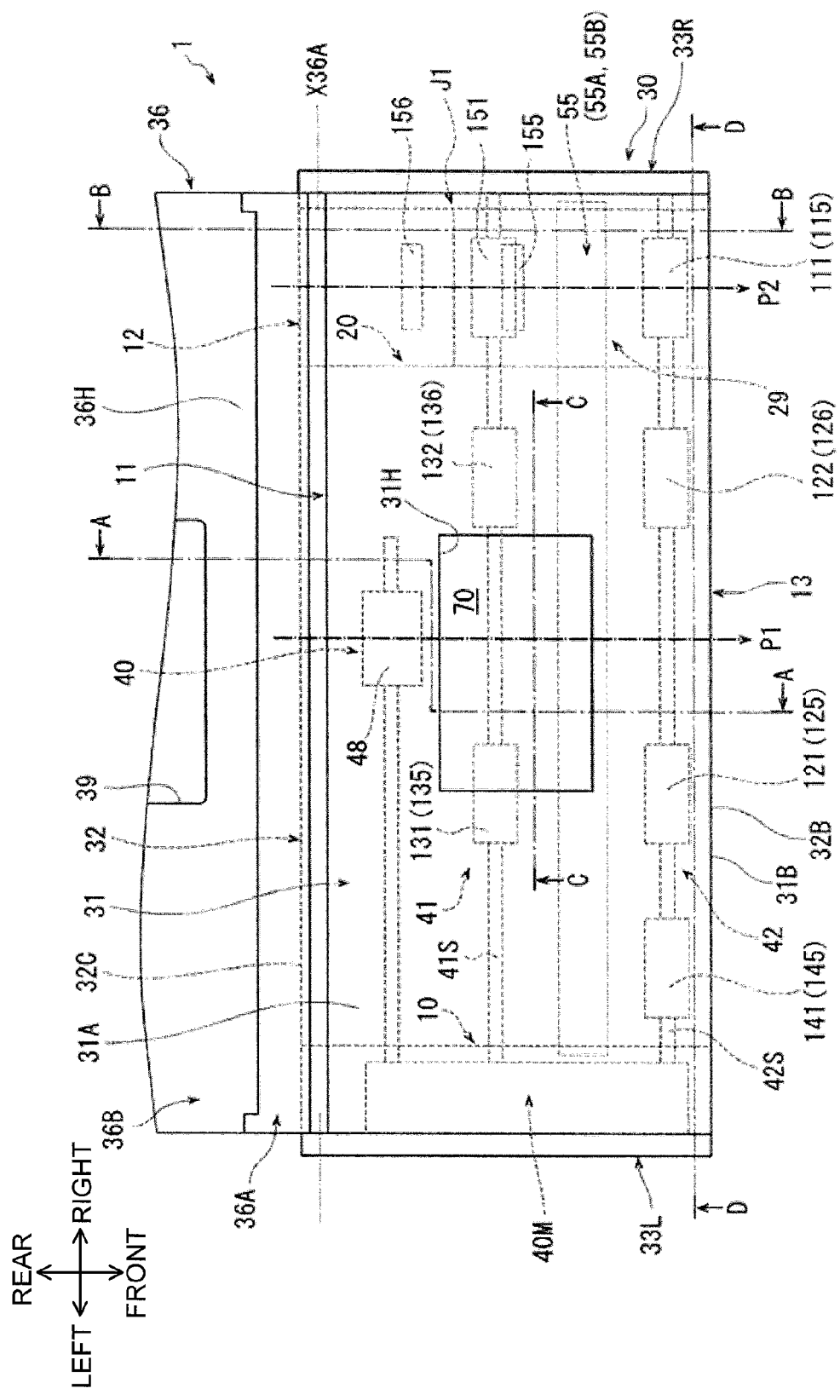
FIG. 4 is a diagrammatic top view of the image reading apparatus in which the sheet tray is open.

As depicted in FIGS. 4, 6 and 8, a junction J1 may be disposed at a position where the lower card guide surface 32J may extend to the right end in FIG. 6, e.g., the rear end, of the horizontal portion of the lower guide surface 32G.

As depicted in FIGS. 1 and 4-6, the housing 30 may define a first introduction opening 11 and a discharge opening 13. One or more media (e.g., sheets SH) may be inserted into the first introduction opening 11. The sheet SH may comprise a wide sheet and a narrow sheet. The wide sheet may comprise, for example, a sheet of with a letter size or a A4-size. The narrow sheet mat comprise, e.g., a postcard. The sheet SH also may comprise, e.g., a plastic card and a business card, in a case in that the sheet SH is easy to be bended and thin enough to be guided along the upper and lower guide surfaces 31G and 32G.

In one example, as depicted in FIG. 5, the first introduction opening 11 may be defined between the first housing 31 and the second housing 32. For example, the first introduction opening 11 may be defined by a space between the rear edge 31GA of the upper guide surface 31G and the rear edge 32GA of the lower guide surface 32G. As depicted in FIG. 1, the first introduction opening 11 may extend in the left-right direction from a portion near the first side wall 33R to a portion near the second side wall 33L. In one example, the length of the first introduction opening 11 in the left-right direction may be longer than the width of the sheet SH.

The left-right direction of the image reading apparatus 1 may be an example of a width direction. In the example embodiment, one end and an opposite end in the width direction may be examples of a right end and a left end, respectively.

As depicted in FIGS. 1 and 5, the sheet SH may be discharged from the discharge opening 13. The discharge opening 13 may be defined between the first housing 31 and the second housing 32. For example, the discharge opening 13 may be defined by a space between the lower end 31BA of the front surface 31B and the upper end 32BA of the front surface 32B. The discharge opening 13 may extend in the left-right direction from a portion near the first side wall 33R to a portion near the second side wall 33L. In one example, the length of the discharge opening 13 in the left-right direction may be longer than the width of the sheet SH, similar to the first introduction opening 11.

As depicted in FIGS. 4-6, the image reading apparatus 1 may comprise a first guide portion 10. The first guide portion 10 may comprise the upper guide surface 31G of the first housing 31 and the lower guide surface 32G of the second housing 32 in the vertical direction. The first guide portion 10 may define a first conveyance path P1. The first guide portion 10 may be configured to guide the sheet SH from the first introduction opening 11 to the discharge opening 13 along the first conveyance path P1.

A portion of the first guide portion 10 may extend frontward and downward from the first introduction opening 11 in a slanted manner. The first guide portion 10 may comprise a bent portion BP, in which the first guide portion 10 bends, in a middle portion of the housing 30 in the front-rear direction. The first guide portion 10 may extend horizontally forward from the bent portion BP to the discharge opening 13. As depicted in FIGS. 5 and 6, the bent portion BP may comprise a boundary between the inclined portion and the horizontal portion of the upper guide surface 31G and a boundary between the inclined portion and the horizontal portion of the lower guide surface 32G.

As depicted in FIG. 7, the first housing 31 may be pivotally attached to the second housing 32 about a rotation axis X31. The rotation axis X31 may extend in the left-right direction at the lower end 31BA of the front surface 31B of the first housing 31. As the first housing 31 pivotally moves to separate from the second housing 32 in an upward direction, the first guide portion 10 may open.

As depicted in FIGS. 2, 4, 6 and 7, the housing 30 may define a second introduction opening 12. A narrow medium (e.g., a card CA having a width smaller than that of the sheet SH) may be inserted into the second introduction opening 12. The card CA may be a medium having an area smaller than that of the sheet SH. The card CA may be, for example, a business card, an ATM card, a membership card, a license card.

According to one or more arrangements, the second introduction opening 12 may be provided in the second housing 32, as depicted in FIGS. 2, 4 and 6. The second introduction opening 12 may be disposed at a portion of the rear surface 32C on the side of the first side wall 33R. The second introduction opening 12 may extend in the left-right direction. The length of the second introduction opening 12 in the left-right direction may be shorter than the length of the first introduction opening 11 in the left-right direction. In one example, the length of the second introduction opening 12 in the left-right direction may be longer than the width of the card CA. The height of the second introduction opening 12 in the vertical direction may be almost the same as the height of the horizontal portion of the first guide portion 10 and the discharge opening 13 in the vertical direction. The second introduction opening 12 may be disposed below a right end portion of the first introduction opening 11 in the vertical direction.

Figure 3:
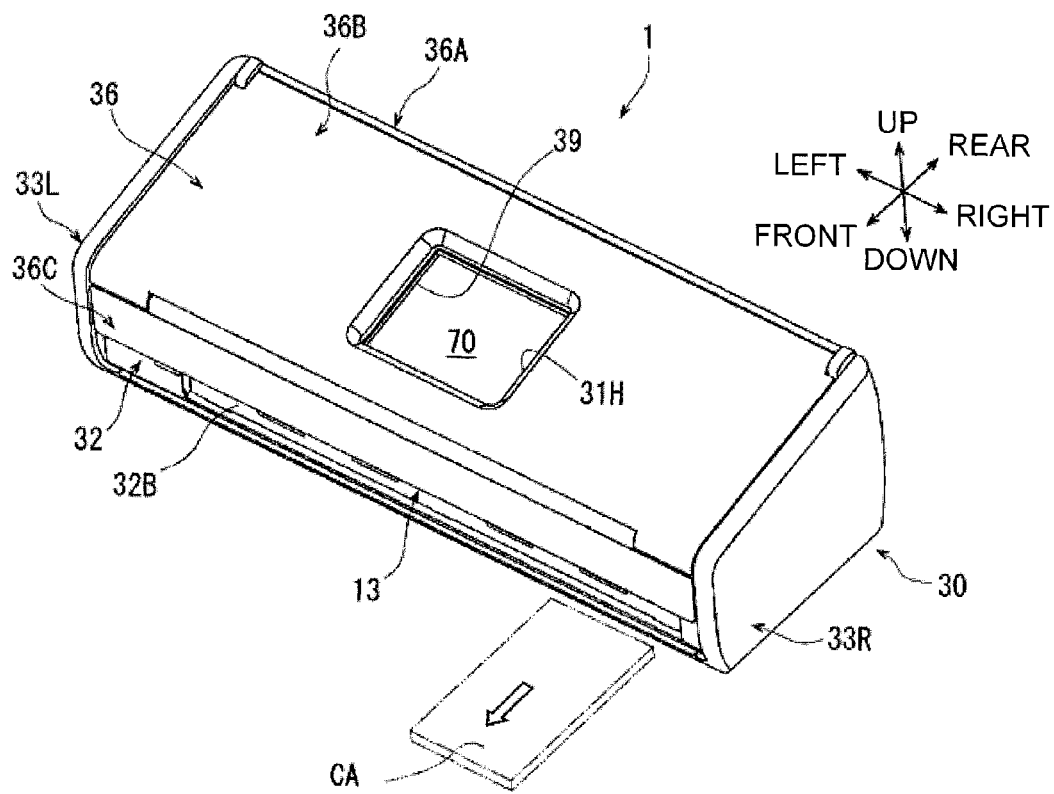
FIG. 3 is a front perspective view of the image reading apparatus in which the sheet tray is closed.

As depicted in FIGS. 3 and 6, the card CA may be discharged from a right end portion of the discharge opening 13. For example, the discharge opening 13 may be shared to discharge the sheet SH inserted through the first introduction opening 11 and the card CA inserted through the second introduction opening 12.

As depicted in FIGS. 4, 6 and 8, the image reading apparatus 1 may comprise a second guide portion 20. The second guide portion 20 may comprise the upper card guide surface 32H and the lower card guide surface 32J in vertical direction. That is, the second guide portion 20 may be provided in the second housing 32. The second guide portion 20 may straightway extend frontward from the second introduction opening 12 and may join the first guide portion 10 at the junction J1.

The junction J1 may be disposed at a proximal portion of the bent portion BP, e.g., a portion between the inclined portion and the horizontal portion of the upper guide surface 31G and the lower guide surface 32G.

As depicted in FIG. 4, the card conveyance area includes a portion of the first guide portion. For example, the portion of the first guide portion 10 on the right side and between the discharge opening and the junction may correspond to a card conveyance area 29. The width of card conveyance area 29 is the same as the width of the second guide portion in the left-right direction. As depicted in FIGS. 4 and 6, the second guide portion 20 and a right side portion of the first guide portion 10 where the card conveyance area 29 may be disposed, may define a second conveyance path P2. The second conveyance path P2 extending horizontally from the second introduction opening 12 disposed on the rear side of the image reading apparatus 1 to the right end portion of the discharge opening 13 disposed on the front side of the image reading apparatus 1.

The card CA may be guided from the second introduction opening 12 to the card conveyance area 29 of the first guide portion 10 along the second conveyance path P2. Then, the card CA may be guided from the card conveyance area 29 to the right side portion of the discharge opening 13 along the second conveyance path P2.

As depicted in FIGS. 1-3, the sheet tray 36 may comprise a base portion 36A, a central portion 36B and a tip portion 36C. The base portion 36A may be pivotally supported by the first and second side walls 33R and 33L about a rotation axis X36A extending along the left-right direction. The central portion 36B may be connected to an end of the base portion 36A further from the rotation axis X36A. The tip portion 36C may be connected to an end of the central portion 36B further from the base portion 36A. The central portion 36B may have an opening 39 of a rectangular shape at a central portion thereof.

When the sheet tray 36 is open as depicted in FIGS. 1, 4 and 5, the base portion 36A, the central portion 36B and the tip portion 36C may extend upward and rearward so as to continue to the inclined portion of the lower guide surface 32G. When the sheet tray 36 is opened, the first introduction opening 11 may be exposed (e.g., open). When the sheet tray 36 is opened, surfaces of the base portion 36A, the central portion 36B and the tip portion 36C those facing upward may comprise a supporting surface 36H. When one or more sheets SH may be placed on the sheet tray 36, the supporting surface 36H supports the sheets SH from below.

When the sheet tray 36 is closed as depicted in FIGS. 2, 3 and 6, the base portion 36A may extend vertically and substantially aligned with the rear surface 32C of the second housing 32. The central portion 36B may cover the upper surface 31A of the first housing 31 from above. The tip portion 36C may cover the front surface 31B of the first housing 31 from the front side of the front surface 31B. As depicted in FIGS. 2 and 3, the opening 39 may allow the touch panel 70 to be exposed outside the image reading apparatus 1 when the sheet tray 36 is closed.

As depicted in FIGS. 1, 5 and 8, the image reading apparatus 1 may comprise a pair of regulation members 36G. The pair of regulation members 36G is separated each other in the left-right direction. The pair of regulation members 36G is connected to the base portion 36A slidably in the left-right direction. The pair of regulation members 36G protrudes upwardly from the supporting surface 36H. Each of the pair of regulation members 36G engages with a rack and pinion mechanism (not shown) that is disposed inside the base portion 36A. When one or more sheets SH may be placed on the sheet tray 36 and be inserted in the first introduction opening 11, each of the pair of regulation members 36G regulates the one or more sheets SH in the left-right direction by contacting the outer edges of the one or more sheets SH in the left-right direction. Each of the pair of regulation members 36G is interlocked by the rack and pinion mechanism, thereby regulating the one or more sheets SH with respect to the center of the first introduction opening 11 in the left-right direction (e.g., the sheets SH may be symmetric with respect to the center of the first introduction opening 11 in the left-right direction).

As depicted in FIG. 1, when the pair of regulation member 36G separates each other with the largest separation distance in the left-right direction, each of the pair of regulation members 36G may regulate a sheets SH with a letter size, for example, with respect to the center of the first introduction opening 11 in the left-right direction. As depicted in FIG. 8, when the pair of regulation member 36G separates each other with a smaller separation distance with respect to the largest separation distance in the left-right direction, each of the pair of regulation members 36G regulates a sheets SH with a postcard size, for example, with respect to the center of the first introduction opening 11 in the left-right direction. Each of the pair of regulation members 36G regulates a sheets SH with a business card size, for example, with respect to the center of the first introduction opening 11 in the left-right direction, when the pair of regulation members 36G become closer with respect to the smaller separation distance in the left-right.

As depicted in FIGS. 4-6, the image reading apparatus 1 may comprise a control board 54, a drive source 40M, a conveyor 40 and a reader 55.

As depicted in FIGS. 5 and 6, the control board 54 may be disposed at a bottom portion of the second housing 32. The control board 54 may be an electronic circuit board comprising a central processing unit (CPU), a read-only memory (ROM), and a random-access memory ("RAM"). Power may be supplied to the control board 54 from a home electric outlet, via an AC adapter and a power supply cord. The control board 54 may be electrically connected to, for example, the drive source 40M, the reader 55, and the touch panel 70.

As depicted in FIG. 4, the drive source 40M may be disposed in the second housing 32 at the second side wall 33L. The drive source 40M may comprise a motor and transmission gears. The drive source 40M may be configured to generate the drive force while the drive source 40M is controlled by the control board 54.

As depicted in FIGS. 4-8, the conveyor 40 may comprise a separation roller 48, a separation pad 49, an upstream conveyor portion 41, and a downstream conveyor portion 42. The reader 55 may comprise a first reader 55A and a second reader 55B. In the first guide portion 10, the separation roller 48 and the separation pad 49 may be followed by the upstream conveyor portion 41, the second reader 55B, the first reader 55A, and the downstream conveyor portion 42 that may be arranged in this order from the upstream side to the downstream side in a conveyance direction. The sheet SH and the card CA may be conveyed in the conveyance direction from the first introduction opening 11 and the second introduction opening 12, respectively, toward the discharge opening 13. The separation roller 48 and the separation pad 49 may be disposed between the first introduction opening 11 and the junction J1. The upstream conveyor portion 41, the second reader 55B, the first reader 55A and the downstream conveyor portion 42 may be disposed between the discharge opening 13 and the junction J1.

As depicted in FIGS. 4, 5 and 8, the separation roller 48 may be rotatably supported in the second housing 32. An upper portion of the separation roller 48 may be exposed from the inclined portion of the lower guide surface 32G toward the first guide portion 10. Since the first guide portion defines the first conveyance path P1, the separation roller 48 can be understood to be exposed from the inclined portion of the lower guide surface 32G toward the first conveyance path P1. The separation roller 48 may be disposed at a central portion of the first guide portion 10 in the left-right direction. The central portion may be defines as a certain area that includes the center of the first guide portion 10 in the left-right direction. The certain area may be an area close to the center of the first guide portion 10 with respect to the card conveyance area 29.

The separation roller 48 may be configured to be driven by the drive source 40M. The control board 54 may be configured to control the drive source 40M. The separation roller 48 may be configured to rotate while making contact with the sheets SH placed on the sheet tray 36 to feed the sheets SH to the first guide portion 10.

As depicted in FIGS. 5 and 7, the separation pad 49 may be disposed at the first housing 31. The separation pad 49 may be exposed to the first guide portion 10 in the upper guide surface 31G. The separation pad 49 may comprise a friction member, e.g., rubber and elastomer, having a plate shape. The separation pad 49 may be biased by an biasing member (not depicted) so that the separation pad 49 may be biased against the separation roller 48 when the first housing 31 is closed. The separation roller 48 and the separation pad 49 may be configured to separate the sheets SH to be conveyed in the first guide portion 10 one by one while nipping the sheets SH therebetween.

As depicted in FIGS. 4-8, the upstream conveyor portion 41 may be disposed between the junction J1 and the second reader 55B. The upstream conveyor portion 41 may comprise third drive rollers 131, 132 and a card drive roller 151.

The third drive rollers 131, 132 and the card drive roller 151 may be disposed in the second housing 32. The third drive rollers 131, 132 and the card drive roller 151 may be connected to an upstream drive shaft 41S. The upstream drive shaft 41S may extend from the drive source 40M to a portion near the first side wall 33R in the left-right direction. The card drive roller 151 may be disposed at a right end portion of the first guide portion 10 and inside the second conveyance path P2. A distance between the third drive rollers 131, 132 and the center of the second housing 32 in the left-right direction is shorter than a distance between the card drive roller 151 and the center of the second housing 32 in the left-right direction. The third drive rollers 131, 132 are disposed outside the second conveyance path P2. The third drive roller 131 is disposed at left side of the separation roller 48. The third drive roller 132 is disposed at right side of the separation roller 48. The third drive rollers 131, 132 and a card drive roller 151 are configured to rotate by a drive force of the drive source 40M. The drive force is transmitted by the upstream drive shaft 41S.

As depicted in FIG. 8, the upstream conveyor portion 41 may comprise third driven rollers 135 and 136, third biasing members 138 and 139, and a card driven roller 155.

Figure 9A:
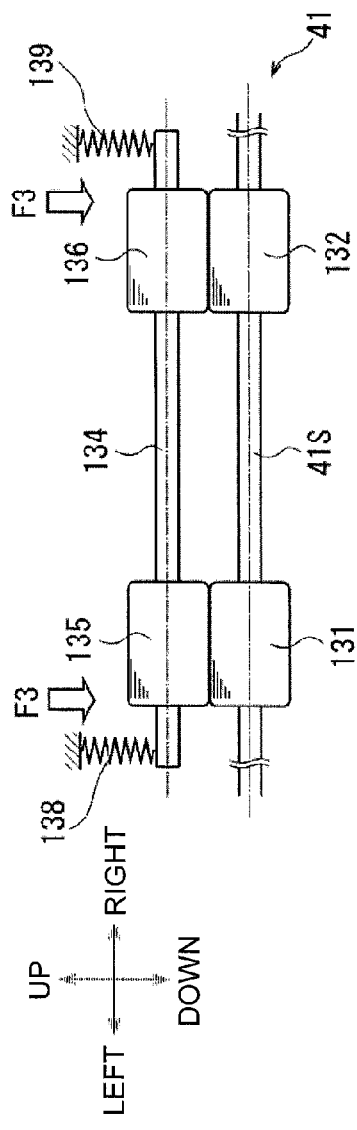
FIG. 9A is a schematic sectional view of a portion of an upstream conveyor portion, which is an example of a second conveyor portion, taken along the line C-C in FIG. 4.

The third driven rollers 135 and 136 may be disposed in the first housing 31. The third driven rollers 135 and 136 may be rotatably connected to third driven shaft 134. As depicted in FIGS. 5, 8 and 9, the third driven shaft 134 may be disposed above the upstream drive shaft 41S and extend in the left-right direction. The left end of the third driven shaft 134 may extend left side of the left end of the third drive roller 131 in the left-right direction. The right end of the third driven shaft 134 may extend right side of the right end of the third drive roller 132 in the left-right direction. The third driven roller 135 may be disposed above the third drive roller 131. The third driven roller 135 may contact with the third drive roller 131 when the first housing 31 is closed. The third driven 136 may be disposed above the third drive roller 132. The third driven roller 136 may contact with the third drive roller 132 when the first housing 31 is closed.

As depicted in FIGS. 8 and 9, the third biasing members 138 and 139 may be disposed in the first housing 31. The third biasing members 138 and 139 may be disposed above the third driven shaft 134. The third biasing members 138 and 139 may be, e.g., coiled springs. The third biasing member 138 may be bias a left end portion of the third driven shaft 134 toward the upstream drive shaft 41S with a third biasing force F3. The third biasing member 139 may be bias a right end portion of the third driven shaft 134 toward the upstream drive shaft 41S with the third biasing force F3. In other words, the third biasing members 138 and 139 may bias the third driven rollers 135 and 136 toward the third drive rollers 131 and 132 with the third biasing force F3, respectively. The third driven rollers 135 and 136 may be biased toward the third drive rollers 131 and 132 by the third biasing force F3. The third drive rollers 131, 132 and the third driven rollers 135, 136 may nip a sheet SH guided by the first guide portion, thereby transmitting a conveying force.

As depicted in FIGS. 6-8, the card driven roller 155 may be supported rotatably by the first housing 131. A portion of the card driven roller 155 may be exposed from the upper guide surface 31G. The card driven roller 155 may face and be spaced apart from the card drive roller 151 in the up-down direction. When a sheet SH, which is wide enough to extend to the second conveyance path P2 (e.g., a paper with the A4-size or the letter size), is guided along the first guide portion 10, the sheet SH passes through a gap between the card drive roller 151 and the card driven roller 155 without being nipped by the card drive roller 151 and the card driven roller 155. On the other hand, when a card CA is guided along the first guide portion 10 via the second guide portion 20, the card CA passes through a gap between the card drive roller 151 and the card driven roller 155 with being nipped by the card drive roller 151 and the card driven roller 155. The card CA receives a feeding force from the card drive roller 151 and the card driven roller 155.

As depicted in FIG. 6, a card aid roller 156 may be disposed in the upper card guide surface 32H of the second guide 20. The card aid roller 156 may bias a card CA, which is inserted in the second introduction opening 12, toward the lower card guide surface 32J.

The second reader 55B may be attached to the second housing 32. For example, the second reader 55B may comprise a contact image sensor ("CIS"), a CIS holder and a contact glass. The upper surface of the second reader 55B may be exposed to the first guide portion 10 at the horizontal portion of the lower guide surface 32G.

The first reader 55A may be attached to the first housing 31. For example, the first reader 55A may comprise a contact image sensor ("CIS"), a CIS holder and a contact glass. The lower surface of the first reader 55A may be exposed to the first guide portion 10 at the horizontal portion of the upper guide surface 31G. The first reader 55A may be disposed closer to the discharge opening 13 than the second reader 55B.

In one or more examples, the first reader 55A and the second reader 55B may be disposed across an entire length of the first guide portion 10. The first reader 55A and the second reader 55B may be disposed opposite to each other in the vertical direction to interpose the first guide portion 10.

The first reader 55A and the second reader 55B may be configured to read an image on each side of the sheet SH when the sheet SH is conveyed in the first guide portion 10. The first reader 55A and the second reader 55B may also be configured to read an image on each side of the card CA when the card CA guided by the second guide portion 20 is conveyed in the card conveyance area 29.

As depicted in FIGS. 4-8 and 9, the downstream conveyor portion 42 may be disposed between the first reader 55A and the discharge opening 13 in the front-rear direction. The downstream conveyor portion 42 may comprise a first drive roller 111, second drive rollers 121 and 122, and a fourth drive roller 141. The first drive roller 111, the second drive rollers 121 and 122, and the fourth drive roller 141 may be disposed in the second housing 32. The first drive roller 111, the second drive rollers 121 and 122, and the fourth drive roller 141 may be fixed in a downstream drive shaft 42S. The downstream drive shaft 42S may extend from the drive source 40M to a portion near the first side wall 33R in the left-right direction. The first drive roller 111 may be disposed in the right end portion of the first guide portion 10, i.e., inside the second conveyance path P2. The second drive rollers 121 and 122 may be disposed in center side of the first guide portion 10 with respect to the first drive roller 111 in the left-right direction. In other words, a distance between a center of the second housing 32 and the second drive rollers 121 and 122 in the left-right direction may be shorter than a distance between the center of the second housing 32 and the first drive roller 111. As depicted in FIG. 4, the second drive rollers 121 and 122 may be disposed outside the second conveyance path P2 in the left-right direction. The second drive rollers 122 may be disposed in a right side of the separation roller 48. The second drive rollers 121 may be disposed in a left side of the separation roller 48. The fourth drive roller 141 may be disposed in a left side of the second drive rollers 122. That is, the fourth drive roller 141 may be disposed in a left end portion of the first guide portion 10. The second drive rollers 121 and 122 may be interposed between the first drive roller 111 and the fourth drive roller 141. The first drive roller 111, the second drive rollers 121 and 122, and the fourth drive roller 141 may be rotated by a drive force transmitted from the drive source 40M via the downstream drive shaft 42S.

As depicted in FIGS. 4-8 and 9, the downstream conveyor portion 42 may also comprise a first driven roller 115, second driven rollers 125 and 126, a fourth driven roller 145, first biasing members 118 and 119, second biasing members 128 and 129 and fourth biasing members 148 and 149.

Figure 9B:
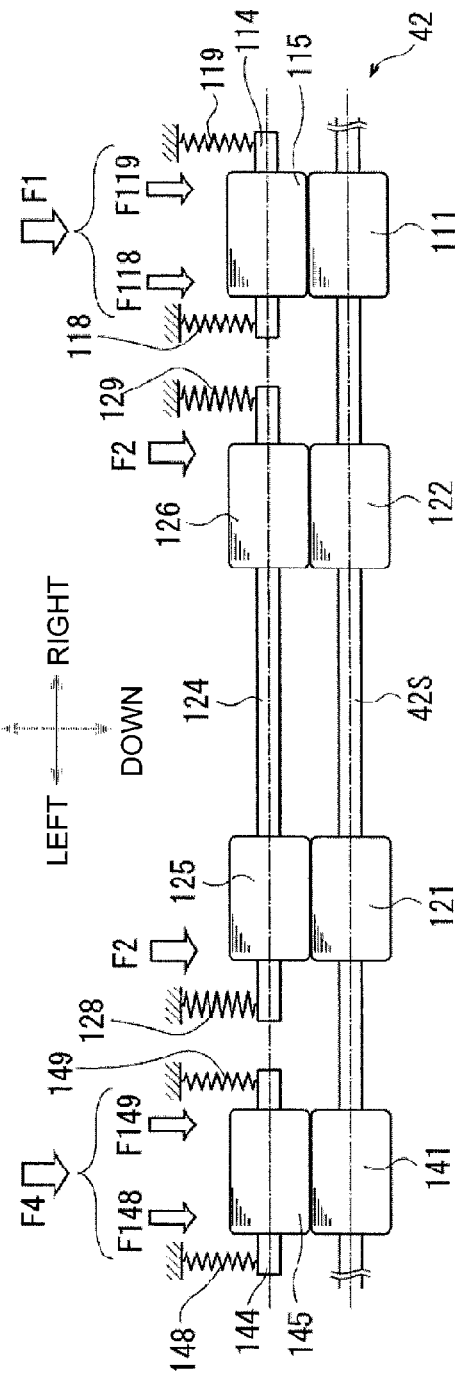
FIG. 9B is a schematic sectional view of a portion of a downstream conveyor portion, which is an example of a first conveyor portion, taken along the line D-D in FIG. 4.

The first driven roller 115 may be disposed in the first housing 31. The first driven roller 115 may be supported rotatably by a first driven shaft 114. As depicted in FIGS. 6, 8 and 9B, the first driven shaft 114 may be disposed in an upper side of the downstream drive shaft 42S. The first driven shaft 114 may extend from a left side of a left side surface of the first drive roller 111 to a right side of a right side surface of the first drive roller 111 in the left-right direction. The first driven roller 115 may be disposed in an upper side of the first drive roller 111. The first driven roller 115 may contact the first drive roller 111 when the first housing 31 is closed.

As depicted in FIGS. 5, 7, 8 and 9B, the second driven rollers 125 and 126 may be disposed in the first housing 31. The second driven rollers 125 and 126 may be supported rotatably by a second driven shaft 124. The second driven shaft 124 may be disposed in an upper side of the downstream drive shaft 42S. The second driven shaft 124 may extend from a left side of a left side surface of the second drive roller 121 to a right side of a right side surface of the second drive roller 122 in the left-right direction. The second driven roller 125 may be disposed in an upper side of the second drive roller 121. The second driven roller 125 may contact the second drive roller 121 when the first housing 31 is closed. The second driven roller 126 may contact the second drive roller 122 when the first housing 31 is closed.

As depicted in FIGS. 7, 8 and 9B, the fourth driven roller 145 may be disposed in the first housing 31. The fourth driven roller 145 may be supported rotatably by a fourth driven shaft 144. The fourth driven shaft 144 may be disposed in an upper side of the downstream drive shaft 42S. The fourth driven shaft 144 may extend from a left side of a left side surface of the fourth drive roller 141 to a right side of a right side surface of the fourth drive roller 141 in the left-right direction. The fourth driven roller 145 may be disposed in an upper side of the fourth drive roller 141. The fourth driven roller 145 may contact the fourth drive roller 141 when the first housing 31 is closed.

As depicted in FIGS. 8 and 9B, the first biasing members 118 and 119 may be, e.g., coiled springs. The first biasing member 118 and 119 may be disposed in the first housing 31. The first biasing member 118 and 119 may be disposed in an upper side of the first driven shaft 114. The first biasing member 118 may bias a left end portion of the first driven shaft 114 toward the downstream drive shaft 42S with a biasing force F118. The first biasing member 119 may bias a right end portion of the first driven shaft 114 toward the downstream drive shaft 42S with a biasing force F119. A first biasing force F1 is a resultant force of the biasing force F 118 and the biasing force F119. In other word, the first biasing members 118 and 119 may bias the first driven roller 115 toward the first drive roller 111 with the first biasing force F1. By virtue of the first biasing force F1, the first drive roller 111 and the first driven roller 115 may nip a left side of a sheet SH to transmit the driving force, when the sheet SH, which is wide enough to extend to the second conveyance path P2, is guided along the first guide portion 10.

The second biasing members 128 and 129 may be, e.g., coiled springs. The second biasing members 128 and 129 may be disposed in the first housing 31. The second biasing members 128 and 129 may be disposed in an upper side of the second driven shaft 124. The second biasing member 128 may bias a left end portion of the second driven shaft 124 toward the downstream drive shaft 42S with a second biasing force F2. The second biasing member 129 may bias a right end portion of the second driven shaft 124 toward the downstream drive shaft 42S with the second biasing force F2. In other word, the second biasing member 128 may bias the second driven roller 125 toward the second drive roller 121 with the second biasing force F2, and the second biasing member 129 may bias the second driven roller 126 toward the second drive roller 122 with the second biasing force F2. By virtue of the second biasing force F2, the second drive rollers 121 and 122 and the second driven rollers 125 and 126 may nip a sheet SH to transmit the driving force, when the sheet SH is guided along the first guide portion 10.

The fourth biasing members 148 and 149 may be, e.g., coiled springs. The fourth biasing members 148 and 149 may be disposed in the first housing 31. The fourth biasing members 148 and 149 may be disposed in an upper side of the fourth driven shaft 144. The fourth biasing member 148 may bias a left end portion of the fourth driven shaft 144 toward the downstream drive shaft 42S with a biasing force F148. The fourth biasing member 149 may bias a right end portion of the fourth driven shaft 144 toward the downstream drive shaft 42S with a biasing force F149. A fourth biasing force F4 is a resultant force of the biasing force F148 and the biasing force F149. In other word, the fourth biasing members 148 and 149 may bias the fourth driven roller 145 toward the fourth drive roller 141 with the fourth biasing force F4. By virtue of the fourth biasing force F4, the fourth drive roller 141 and the fourth driven roller 145, which are disposed in an opposite side with respect to the first drive roller 111 and the first driven roller 115 in the left-right direction, may nip a right side of a sheet SH to transmit the driving force, when the sheet SH, which is wide enough to extend to the second conveyance path P2, is guided along the first guide portion 10.

The first biasing force F1, the second biasing force F2, the third biasing force F3 and the force biasing force F4 may be set to satisfy the following magnitude relationship. The second biasing force F2 may be greater than the first biasing force F1. For example, the second biasing force F2 may be equal to or greater than 1.2 times the first biasing force F1. Further, the second biasing force F2 may be equal to or less than 1.8 times the first biasing force F1. The magnitude relationship between the first biasing force F1 and the second biasing force F2 may be set on the basis of a result of experiments conducted by the inventor (see e.g., FIG. 10 which is described later). The third biasing force F3 may be equal to the second biasing force F2. The fourth biasing force F4 may be equal to the first biasing force F1. Note that the term of "equal to" include tolerance in production.

In this disclosure, the biasing forces F118 and F119 may be 250 gram-force (gf), and the first biasing force F1, which is the resultant force of the biasing forces F118 and F 119, may be 500 gf, for example. The second biasing force F2 and the third biasing force F3 may be equal to or greater than 750 gf, which is 1.5 times greater than the first biasing force F1. The biasing forces F148 and F149 may be 250 gf, and the first biasing force F4, which is the resultant force of the biasing forces F148 and F149, may be 500 gf.

As depicted in FIGS. 1 and 5, the touch panel 70 may be attached to an interior of the first housing 31 on the upper surface 31A side. The touch panel 70 may be exposed outside the first housing 31 through a rectangular-shaped touch panel opening 31H that may be provided in the upper surface 31A. The touch panel 70 may comprise a liquid crystal display panel, a light source, e.g., fluorescent lamp or a light-emitting diode (LED), configured to irradiate the liquid crystal display panel with light from the back side of the liquid crystal display panel, and a contact sensing film attached to a surface of the liquid crystal display panel.

The touch panel 70 may be configured to display an operational status of the image reading apparatus 1, e.g., a processing status of an image reading operation and errors, and various buttons, e.g., buttons to start an image reading operation and to make settings, under the control of the control board 54. The touch panel 70 may be configured to permit an external input. When a button displayed in the touch panel 70 is touched (e.g., selected) to perform an operation or setting corresponding to the button, the touch panel 70 may transmit a signal in response to the touch operation, to the control board 54.

The image reading apparatus 1 may be configured to read an image on the sheet SH and the card CA.

When an image on the sheet SH is read, the sheet tray 36 may be open, as depicted in FIGS. 1 and 5. One or more sheets SH may be placed on the sheet tray 36. When the control board 54 receives an instruction to read an image on the sheet SH from the touch panel 70, the control board 54 may refer to the detection result of a sheet detection sensor (not shown). When the control board 54 determine that at least one sheet SH placed on the sheet tray 36 is held or nipped between the separation roller 48 and the separation pad 49 based on the detection result of the sheet detection sensor, the control board 54 may start the operation of reading an image on the sheet SH.

The control board 54 may send an instruction to generate the drive force to the drive source 40M. In response to the instruction, the separation roller 48 may be first rotated while holding the sheet SH together with the separation pad 49. The separation roller 48 may introduce the sheet SH placed on the sheet tray 36 through the first introduction opening 11 and feed the sheet SH to the first guide portion 10. At this time, the sheets SH may be separated one by one due to frictional force between the separation pad 49 and the sheet SH.

Thereafter, the third drive rollers 131 and 132 and the third driven rollers 135 and 136, which are a portion of the upstream conveyor portion 41, may convey the sheet SH fed by the separation roller 48 in the first guide portion 10. The first reader 55A and the second reader 55B may be read an image on each side of the sheet SH being conveyed in the first guide portion 10. The first drive roller 111, the second drive rollers 121 and 122, the fourth drive roller 141, the first driven roller 115, the second driven rollers 125 and 126 and the fourth driven roller 145, which are a portion of the downstream conveyor portion 42, may discharge the sheet SH whose image has been read, outside the housing 30 through the discharge opening 13.

When an image on the card CA is read, the sheet tray 36 may be closed, as depicted in FIGS. 2, 3 and 6. When the sheet tray 36 is closed, the card CA may be inserted into the second introduction opening 12 from the rear side of the housing 30, as depicted in FIG. 2. Thereafter, the card CA may pass through the second guide portion 20. The leading end of the card CA may reach the card conveyance area 29. When the control board 54 receives an instruction to read an image on the card CA from the touch panel 70, the control board 54 may refer to the detection result of a card detection sensor (not shown). When the control board 54 may determine that the card CA inserted from the second introduction opening 12 passes the second guide portion 20, and the leading end of the card CA reaches the card conveyance area 29 based on the detection result of the card detection sensor, the control board 54 may start the operation of reading an image on the card CA.

The control board 54 may be configured to send an instruction to generate the drive force to the drive source 40M. The card drive roller 151 of the upstream conveyor portion 41 may convey the card CA in the card conveyance area 29. The first reader 55A and the second reader 55B may read an image on each side of the card CA being conveyed in the card conveyance area 29. As depicted in FIG. 3, the first drive roller 111 and the first driven roller 115, which are a portion of the upstream conveyor portion 41, 42 may discharge the card CA whose image has been read, outside the housing 30 through the discharge opening 13.

In the image reading apparatus 1 of this disclosure, the second biasing force F2 of the second biasing members 128 and 129 may be greater than the first biasing force F1 of the first biasing members 118 and 119. For example, the second biasing force F2 may be greater than or equal to 1.2 times the first biasing force F1 and less than or equal to 1.8 times the first biasing force F1, thereby the second drive rollers 121 and 122 and the second driven rollers 125 and 126 may nip a sheet SH stronger than the first drive roller 111 and the first driven roller 115. Since the second drive rollers 121 and 122 and the second driven rollers 125 and 126 may be close to a center of the first guide portion 10 in the left-right direction, slipping between a sheet SH, which is narrow enough not to be nipped by the first drive roller 111 and the first driven roller 115 such as a postcard and business card, and the second drive rollers 121 and 122 may be prevented. Therefore, in the image reading apparatus 1, it is possible to suppress the conveying speed difference between the wide media and the narrow media, when plural media with different width are introduced in the first introduction opening.

In FIG. 10, the horizontal axis indicates a nip load in ratio of the second biasing force F2 to the first biasing force F1. The vertical axis indicates a sub-scanning magnitude. The sub-scanning magnitude a variation of a length (in percent) of an image of a sheet SH read by the reader 55 in the conveyance direction with respect to the actual size of the sheet SH in the conveyance direction.

The broken line L1 indicates a relationship between the nip load and the sub-scanning magnitude when a business card with a thickness of 0.2 mm, which is an example of a sheet SH, is fed by the conveyor 40. The broken line L2 indicates a relationship between the nip load and the sub-scanning magnitude when a postcard with a thickness of 0.2 mm, which is another example of a sheet SH, is fed by the conveyor 40. The broken line L3 indicates a relationship between the nip load and the sub-scanning magnitude when a business card with a thickness of 0.3 mm, which is yet another example of a sheet SH, is fed by the conveyor 40.

As shown by the broken lines L1, L2 and L3, when the second biasing force F2 is equal to the first biasing force F1, the sub-scanning magnitude corresponds to 4-9%, indicating that the image read by the reader 55 is extended in the conveyance direction than actual. When the second biasing force F2 is greater than the first biasing force F1, the sub-scanning magnitude decreases as the second biasing force increases. The sub-scanning magnitude is small enough to satisfy an acceptable quality level when the second biasing force is greater than or equal to 1.2 times the first biasing force. The sub-scanning magnitude is substantial constant when the second biasing force is greater than 1.8 times the first biasing force. Based on this experimental result, it is clearly shown than slipping between a sheet SH, which is narrow enough not to be nipped by the first drive roller 111 and the first driven roller 115 such as a postcard and business card, and the second drive rollers 121 and 122 may be prevented.

The first biasing force F1 does not increase like the second biasing force F2, the stiffness of the housing may be rigid enough even if the reaction force corresponding to the increase of the second biasing force F2 affects the housing. In the image reading apparatus 1, since the first housing 31 may be supported by the second housing 32 at both end portions, interposing the discharge opening 13, in the left right direction, the center of the first housing 31 in the left-right direction may be deformed by the reaction force of the first biasing force F1 and the second biasing force F2. In the image reading apparatus 1, since the first biasing force F1 is less than the second biasing force F2, the lack of stiffness of the first housing 31 may be suppressed.

Therefore, in the image reading apparatus 1, it is possible to suppress the convening speed difference between the wide media and the narrow media, when plural media with different width are introduced in the first introduction opening 11, while suppressing the lack of the stiffness of the housing 30.

Further, since the third biasing members 138 and 139 may bias the third driven rollers 135 and 136 toward the third drive rollers 131 and 132 with the third biasing force F3, which may be equal to the second biasing force F2, slipping between a sheet SH, which is narrow enough not to be nipped by the first drive roller 111 and the first driven roller 115, and the third drive rollers 131 and 132 may be prevented. Therefore, it is more robustly possible to suppress the convening speed difference between the wide media and the narrow media, when plural media with different width are introduced in the first introduction opening 11.

Further, in the image reading apparatus 1, since the first drive roller 111 and the first driven roller 115 in the right end portion of the first guide portion 10 may be paired with the fourth drive roller 141 and the fourth driven roller 145 in the left end portion of the first guide portion 10 to convey a wide sheet SH introduced in the introduction opening 11, the sheet SH is prevent from skewing.

While the disclosure has been described in detail with reference to the specific embodiment thereof, this is merely an example, and various changes, arrangements and modifications may be applied therein without departing from the spirit and scope of the disclosure.

What is claimed is:

1. An image reading apparatus comprising:
   a housing:
   a first guide disposed in the housing and configured to provide a first path between a first opening and a second opening, the first guide comprising an first portion and a second portion, the first opening extending in a first direction, the second opening extending in the first direction, the second opening being in communication with the first opening, the first portion being inclined and where the first portion of the first guide extends from the first opening to a first position and the second portion of the first guide extends from the first position to the second opening;
   a second guide disposed in the housing and configured to provide a second path between a third opening and a junction, the junction being located where the first path intersects the second path, the third opening being in communication with the second opening and being offset from the first opening in a second direction, the third opening being formed in a position located at one side of the first opening in the first direction;
   a first conveyor comprising:
      a first drive roller disposed inside a path between the third opening and the second opening, the path comprising at least the second path and the first drive roller being offset of a center of the first guide in the first direction;
      a second drive roller disposed outside the path between the third opening and the second opening and a distance between the center of the first guide and the second drive roller being less than a distance between the center of the first guide and the first drive roller in first direction;
      a first driven roller opposing the first drive roller;
      a second driven roller opposing the second drive roller;
      a first spring biasing the first driven roller toward the first drive roller with a first biasing force ($F_1$); and
      a second spring biasing the second driven roller toward the second drive roller with a second biasing force ($F_2$), where $F_2 > F_1$,
   the first conveyor being in the second portion of the first guide; and
   a reader being configured to read an image of a medium passing through the junction.

2. The image reading apparatus according to claim 1, wherein
   $F_2 \geq 1.2 * F_1$.

3. The image reading apparatus according to claim 1, wherein
   $1.2 * F_1 \leq F_2 \leq 1.8 * F_1$.

4. The image reading apparatus according to claim 1, wherein
the first driven roller is fixed to a first shaft, and the first spring contacts the first shaft to bias the first driven roller toward the first drive roller, and
wherein the second driven roller is fixed to a second shaft, and the second spring contacts the second shaft to bias the second driven roller toward the second drive roller, the first and second shaft being different.

5. The image reading apparatus according to claim 1, wherein
the first spring comprises a pair of springs, and wherein the second spring comprises a pair of springs.

6. The image reading apparatus according to claim 5, wherein
one of the pair of springs of the first spring contacts one end of the first shaft in the first direction, and the other of the pair of springs of the first spring contacts the other end of the first shaft in the first direction, and wherein
one of the pair of springs of the second spring contacts one end of the second shaft in the first direction, and the other of the pair of springs of the second spring contacts other end of the second shaft in the first direction.

7. The image reading apparatus according to claim 5, wherein
a biasing force of one of the pair of springs of the first spring being ½ $F_1$ and
wherein a biasing force of one of the pair of springs of the second spring being ½ $F_2$.

8. The image reading apparatus according to claim 1, wherein
the first conveyor further comprises:
a third drive roller disposed opposite to the first drive roller with respect to the center of the first guide in the first direction and equidistant from the center of the first guide in the first direction as the first drive roller with respect to the center of the first guide in the first direction;
a third driven roller opposing the third drive roller; and
a third spring biasing the third driven roller toward the third drive roller with a third biasing force ($F_3$), where $F_3=F_1$.

9. The image reading apparatus according to claim 1, further comprising:
a second conveyor disposed between the first position of the first guide and the reader, the second conveyor comprising:
a fourth drive roller disposed outside the path between the third opening and the second opening and a distance between the center of the first guide and the fourth drive roller being less than a distance between the center of the first guide and the first drive roller in first direction; and
a fourth driven roller opposing the fourth drive roller; and
a fourth spring biasing the fourth driven roller toward the fourth drive roller with a fourth biasing force ($F_4$), where $F_4>F_1$.

10. The image reading apparatus according to claim 9, wherein $F_4=F_2$.

11. The image reading apparatus according to claim 1, wherein
the reader is disposed in the housing and disposed between the second opening and the first position of the first guide in a third direction, the third direction being perpendicular to the first and the second directions.

12. The image reading apparatus according to claim 11, wherein
the first conveyor is disposed between the second opening and the reader.

13. The image reading apparatus according to claim 1, wherein
the housing comprises:
a first housing; and
a second housing configured to support the first housing movably between a close position and an open position, wherein
the second guide is disposed in the second housing, wherein
the third opening is formed on the second housing, wherein
a first surface of the first housing and a second surface of the second housing form the first guide, the first surface and the second surface facing each other in the second direction when the first housing is in the close position, wherein
the first surface of the first housing and the second surface of the second housing define the first opening and the second opening, wherein
the first drive roller and the second drive roller are disposed in the second housing, and wherein
the first driven roller, the second driven roller, the first spring and the second spring are disposed in the first housing.

14. The image reading apparatus according to claim 1, further comprising:
a set of slidable protrusions configured to regulate a medium introduced in the first opening with respect to the center of the first guide.

15. An image reading apparatus comprising:
a housing having:
a first opening extending in a first direction;
a second opening having a length shorter than a length of the first opening in the first direction, the second opening being formed in a position located at one side of the first opening in the first direction and being offset from the first opening in a second direction, the second direction being perpendicular to the first direction; and
a third opening,
wherein the housing defines a first conveyance path communicating the first opening and the third opening,
wherein the housing further defines a second conveyance path communicating the second opening and the third opening, at least a portion of the second conveyance path being offset from at least a portion of the first conveyance path in the second direction,
a separation roller rotatably supported in the housing, the separation roller being disposed inside the first conveyance path and outside the second conveyance path in the first direction;
a set of slidable protrusions configured to be slidable in the first direction with respect to a center of the separation roller in the first direction;
a reader disposed in the housing and disposed between the separation roller and the third opening in a third direction, the reader being configured to read an image of a medium introduced in at least one of the first opening and the second opening, the third direction being perpendicular to the first direction and the second direction;
a first drive roller disposed between the separation roller and the third opening in the third direction and inside the second conveyance path in the first direction;

a second drive roller disposed between the separation roller and the third opening in the third direction and outside the second conveyance path in the first direction, and a distance between a center of the separation roller and the second drive roller being less than a distance between the center of the separation and the first drive roller in the first direction;

a first driven roller opposing the first drive roller;

a second driven roller opposing the second drive roller;

a first spring biasing the first driven roller toward the first drive roller with a first biasing force ($F_1$); and a second spring biasing the second driven roller toward the second drive roller with a second biasing force ($F_2$), where $F_2 > F_1$.

16. The image reading apparatus according to claim 15, wherein $F_2 \geq 1.2 * F_1$.

17. The image reading apparatus according to claim 15, wherein $1.2 * F_1 \leq F_2 \leq 1.8 * F_1$.

18. The image reading apparatus according to claim 15, wherein the first driven roller is fixed to a first shaft, and the first spring contacts the first shaft to bias the first driven roller toward the first drive roller, and wherein the second driven roller is fixed to a second shaft, and the second spring contacts the second shaft to bias the second driven roller toward the second drive roller, the first and second shaft being different.

19. The image reading apparatus according to claim 1, wherein the first spring comprises a pair of springs, and wherein the second spring comprises a pair of springs.

20. An image reading apparatus comprising:

a first housing comprising a first surface and configured to be movable between a close position and an open position, the first surface comprising a first portion and a second portion, the first portion being inclined and where the first portion extends from one end of the first surface to a first position and the second portion extends from the first position to other end of the first surface in a first direction;

a second housing opposing the first housing when the first housing is in the close position, the second housing comprising a second surface facing and spaced apart from the first surface in a second direction perpendicular to the first direction when the first housing is in the close position, the second housing comprising a third surface and a fourth surface facing and spaced apart from the third surface in the second direction, the third surface and the fourth surface extending in a third direction perpendicular to the first and second directions and having a width (W), the second housing being configured to support the first housing movably, the second surface comprising an third portion and a fourth portion, the third portion being inclined and where the third portion extends from one end of the second surface to a second position and the fourth portion extends from the second position to other end of the second surface in the first direction;

a separation roller rotatably supported in the second housing and exposed from the third portion of the second surface of the second housing;

a set of slidable protrusions, each configured to be slidable relative to in conjunction with each other in the third direction with respect to the separation roller;

a reader disposed between the separation roller and the other end of the second surface of the second housing in the first direction, the reader being configured to read an image of a medium when a medium is conveyed between the first surface of the first housing and the second surface of the second housing;

a first drive roller disposed between the separation roller and the other end of the second surface of the second housing in the first direction, the first drive roller being exposed from one of the second portion of the first surface of the first housing and the fourth portion of the second surface of the second housing, wherein the first drive roller disposed within the width (W) of the third surface and the fourth surface of the second housing;

a second drive roller disposed between the separation roller and the other end of the second surface of the second housing in the first direction, the second drive roller being exposed from the one of the second portion of the first surface of the first housing and the fourth portion of the second surface of the second housing, and a distance between a center of the separation roller and the second drive roller being less than a distance between the center of the separation and the first drive roller in third direction, wherein the second drive roller disposed outside the width (W) of the third surface and the fourth surface of the second housing;

a first driven roller exposed from the other of the second portion of the first surface of the first housing and the fourth portion of the second surface of the second housing, the first driven roller opposing the first drive roller;

a second driven roller exposed from the other of the second portion of the first surface of the first housing and the fourth portion of the second surface of the second housing, the second driven roller opposing the second drive roller;

a first spring biasing the first driven roller toward the first drive roller with a first biasing force ($F_1$); and a second spring biasing the second driven roller toward the second drive roller with a second biasing force ($F_2$), where $F_2 > F_1$.

21. An apparatus comprising:

a housing:

a first guide disposed in the housing and configured to provide a first path between a first opening and a second opening, the first guide comprising an first portion and a second portion, the first opening extending in a first direction, the second opening extending in the first direction, the second opening being in communication with the first opening, the first portion being inclined and where the first portion of the first guide extends from the first opening to a first position and the second portion of the first guide extends from the first position to the second opening;

a second guide disposed in the housing and configured to provide a second path between a third opening and a junction, the junction being located where the first path intersects the second path, the third opening being in communication with the second opening and being offset from the first opening in a second direction, the third opening being formed in a position located at one side of the first opening in the first direction; and a first conveyor comprising:

a first drive roller disposed inside a path between the third opening and the second opening, the path comprising at least the second path and the first drive roller being offset of a center of the first guide in the first direction;

a second drive roller disposed outside the path between the third opening and the second opening and a distance between the center of the first guide and the second drive roller being less than a distance between the center of the first guide and the first drive roller in first direction;

a first driven roller opposing the first drive roller a second driven roller opposing the second drive roller;

a first spring biasing the first driven roller toward the first drive roller with a first biasing force ($F_1$); and a second spring biasing the second driven roller toward the second drive roller with a second biasing force ($F_2$), where $F_2 > F_1$, the first conveyor being in the second portion of the first guide.

* * * * *